(12) United States Patent
Kuang et al.

(10) Patent No.: US 6,590,299 B2
(45) Date of Patent: Jul. 8, 2003

(54) HYBRID ELECTRIC VEHICLE CONTROL STRATEGY TO PROVIDE VEHICLE CREEP AND HILL HOLDING

(75) Inventors: Ming Lang Kuang, Canton, MI (US); Mary Theresa Breida, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 48 days.

(21) Appl. No.: 09/683,010

(22) Filed: Nov. 8, 2001

(65) Prior Publication Data

US 2003/0085576 A1 May 8, 2003

(51) Int. Cl.$^7$ ................................................. F02N 11/06
(52) U.S. Cl. .................................................... 290/40 C
(58) Field of Search ................................. 290/40 C, 17; 477/107; 475/5

(56) References Cited

U.S. PATENT DOCUMENTS

| | | | |
|---|---|---|---|
| 4,585,085 A | | 4/1986 | Handel et al. |
| 4,644,826 A | * | 2/1987 | Kubo et al. ................... 477/95 |
| 5,343,970 A | | 9/1994 | Severinsky |
| 5,376,869 A | * | 12/1994 | Konrad ....................... 318/587 |
| 5,771,478 A | | 6/1998 | Tsukamoto et al. |
| 5,801,499 A | | 9/1998 | Tsuzuki et al. |
| 5,887,670 A | | 3/1999 | Tabata et al. |
| 5,984,034 A | | 11/1999 | Morisawa et al. |
| 6,054,776 A | * | 4/2000 | Sumi ........................... 290/17 |
| 6,093,974 A | | 7/2000 | Tabata et al. |
| 6,190,284 B1 | * | 2/2001 | Kuroda et al. ............... 477/107 |
| 6,278,916 B1 | * | 8/2001 | Crombez ..................... 701/22 |
| 6,307,277 B1 | * | 10/2001 | Tamai et al. .............. 290/40 C |
| 6,321,144 B1 | * | 11/2001 | Crombez ..................... 701/22 |
| 6,338,398 B1 | * | 1/2002 | Eguchi ....................... 188/134 |
| 6,428,438 B1 | * | 8/2002 | Bowen .......................... 475/5 |
| 6,457,454 B1 | * | 10/2002 | Gras ....................... 123/406.23 |

* cited by examiner

*Primary Examiner*—Joseph Waks
(74) *Attorney, Agent, or Firm*—Foster Swift

(57) ABSTRACT

A control strategy for a hybrid electric vehicle (HEV) to meet driver expectation for hill holding or creep capability found in conventional automobiles with an automatic transmission. The strategy is activated when the PRNDL is in drive or low-drive position and no accelerator applied. Alternatively, the strategy can also require no brake being applied as well. The strategy can use the traction motor, generator motor or engine to achieve creep or hill holding. The engine is used when the traction motor temperature exceeds a predefined value or the engine is already running. If the engine is not running, the strategy can determine when to start it and regulate the amount of engine torque needed to hold the vehicle on the hill using the generator motor. The strategy maintains efficient engine usage and minimizes battery usage and loss.

8 Claims, 2 Drawing Sheets

HYBRID ELECTRIC VEHICLE CONTROL STRATEGY TO PROVIDE VEHICLE CREEP AND HILL HOLDING

BACKGROUND OF INVENTION

The present invention relates generally to a hybrid electric vehicle (HEV), and specifically to a strategy to provide vehicle creep and hill holding similar to a conventional internal combustion vehicle with an automatic transmission.

The need to reduce fossil fuel consumption and emissions in automobiles and other vehicles predominately powered by internal combustion engines (ICEs) is well known. Vehicles powered by electric motors attempt to address these needs. Another alternative solution is to combine a smaller ICE with electric motors into one vehicle. Such vehicles combine the advantages of an ICE vehicle and an electric vehicle and are typically called hybrid electric vehicles (HEVs). See generally, U.S. Pat. No. 5,343,970 to Severinsky.

The HEV is described in a variety of configurations. Many HEV patents disclose systems where a driver is required to select between electric and internal combustion operation. In other configurations, the electric motor drives one set of wheels and the ICE drives a different set.

Other, more useful, configurations have developed. For example, a series hybrid electric vehicle (SHEV) configuration is a vehicle with an engine (most typically an ICE) connected to an electric motor called a generator. The generator, in turn, provides electricity to a battery and another electric motor, called a traction motor. In the SHEV, the traction motor is the sole source of wheel torque. There is no mechanical connection between the engine and the drive wheels. A parallel hybrid electrical vehicle (PHEV) configuration has an engine (most typically an ICE) and an electric motor that work together in varying degrees to provide the necessary wheel torque to drive the vehicle. Additionally, in the PHEV configuration, the motor can be used as a generator to charge the battery from the power produced by the ICE.

A parallel/series hybrid electric vehicle (PSHEV) has characteristics of both PHEV and SHEV configurations and is sometimes referred to as a powersplit configuration. In one of several types of PSHEV configurations, the ICE is mechanically coupled to two electric motors in a planetary gear-set transaxle. A first electric motor, the generator, is connected to a sun gear. The ICE is connected to a carrier gear. A second electric motor, a traction motor, is connected to a ring (output) gear via additional gearing in a transaxle. Engine torque can power the generator to charge the battery. The generator can also contribute to the necessary wheel (output shaft) torque if the system has a one-way clutch. The traction motor is used to contribute wheel torque and to recover braking energy to charge the battery. In this configuration, the generator can selectively provide a reaction torque that may be used to control engine speed. In fact, the engine, generator motor and traction motor can provide a continuous variable transmission (CVT) effect. Further, the HEV presents an opportunity to better control engine idle speed over conventional vehicles by using the generator to control engine speed.

The desirability of combining an ICE with electric motors is clear. There is great potential for reducing vehicle fuel consumption and emissions with no appreciable loss of vehicle performance or drivability. The HEV allows the use of smaller engines, regenerative braking, electric boost, and even operating the vehicle with the engine shutdown. Nevertheless, new ways must be developed to optimize the HEV's potential benefits.

A successful HEV implementation should consider that drivability and performance of the vehicle meet driver expectations of a comparable conventional ICE powered vehicle.

One such area of HEV development is providing vehicle creep and hill holding comparable to a conventional ICE vehicle with an automatic transmission. A HEV controller to meet this expectation needs to be developed.

HEV controllers are known in the prior art. Severinsky describes a simplistic HEV control unit. Other patents refer to creep functions for an HEV, but only generally and only as part of an overall configuration. U.S. Pat. No. 5,771,478 to Tsukamoto et al. describes current flows through the generator/motor, making it possible to generate a creep force similar to that of a conventional torque converter. U.S. Pat. No. 5,801,499 to Tsuzuki et al., has a "no-creep" mode to prevent vehicle movement. U.S. Pat. No. 5,887,670 to Tabata et al. and U.S. Pat. No. 5,984,034 to Morisawa et al. have creep calculations in various drive modes to mimic conventional engine creep at idle speeds. And, U.S. Pat. No. 6,093,974 to Tabata et al. mimics the creep force in electric mode by maintaining braking pressure even after the brake pedal is released.

Unfortunately, none of the known prior art appear to have the strategy of the present invention combining powertrain mode and motor temperature to provide hill holding and vehicle creep comparable to a conventional ICE vehicle with an automatic transmission while optimizing total powertrain system efficiency and performance in various operating states. This would include a controller to provide this feature even when an engine is not even running.

SUMMARY OF INVENTION

Accordingly, the present invention provides a strategy to control a split powertrain hybrid electric vehicle (HEV) to coordinate the HEV's power sources to satisfy driver demand and expectation for vehicle creep and hill holding while optimizing the total powertrain system efficiency and performance.

Specifically, the invention provides a control system for an HEV powertrain powered by at least one of an engine, a traction motor, and a generator motor, comprising sensors for accelerator position, traction motor temperature, vehicle speed, PRNDL position, and a battery for powering the traction motor and generator motor and receiving power from the generator motor. The powertrain controller can be a vehicle system control (VSC) and receive sensor input and determine whether zero accelerator demand is requested while in a forward drive mode, whether the vehicle is rolling backward, whether the engine is running, and whether the traction motor exceeds a predetermined temperature threshold. The engine is started if it is off and traction motor temperature exceeds a predetermined threshold or the vehicle is rolling backward. A motor torque request can be requested when the engine is off, accelerator demand is zero, the PRNDL is in the forward drive mode, and the vehicle is not rolling backward based on creep torque or hill holding function requirements. The present invention can command the engine to start and provide engine torque when the engine is off, accelerator demand is zero, the PRNDL is in the forward drive mode, and the vehicle is rolling backward based on creep torque or hill holding function requirements. Also, the present invention can command engine torque when the engine is running, accelerator demand is zero, and the PRNDL is in the forward drive mode based on creep torque or hill holding function requirements.

Another embodiment of the invention can also include a requirement that a brake position is zero before requesting the engine or motor torque request.

Other objects of the present invention will become more apparent to persons having ordinary skill in the art to which the present invention pertains from the following description taken in conjunction with the accompanying figures.

BRIEF DESCRIPTION OF DRAWINGS

The foregoing objects, advantages, and features, as well as other objects and advantages, will become apparent with reference to the description and figures below, in which like numerals represent like elements and in which.

DETAILED DESCRIPTION

Figure 1:
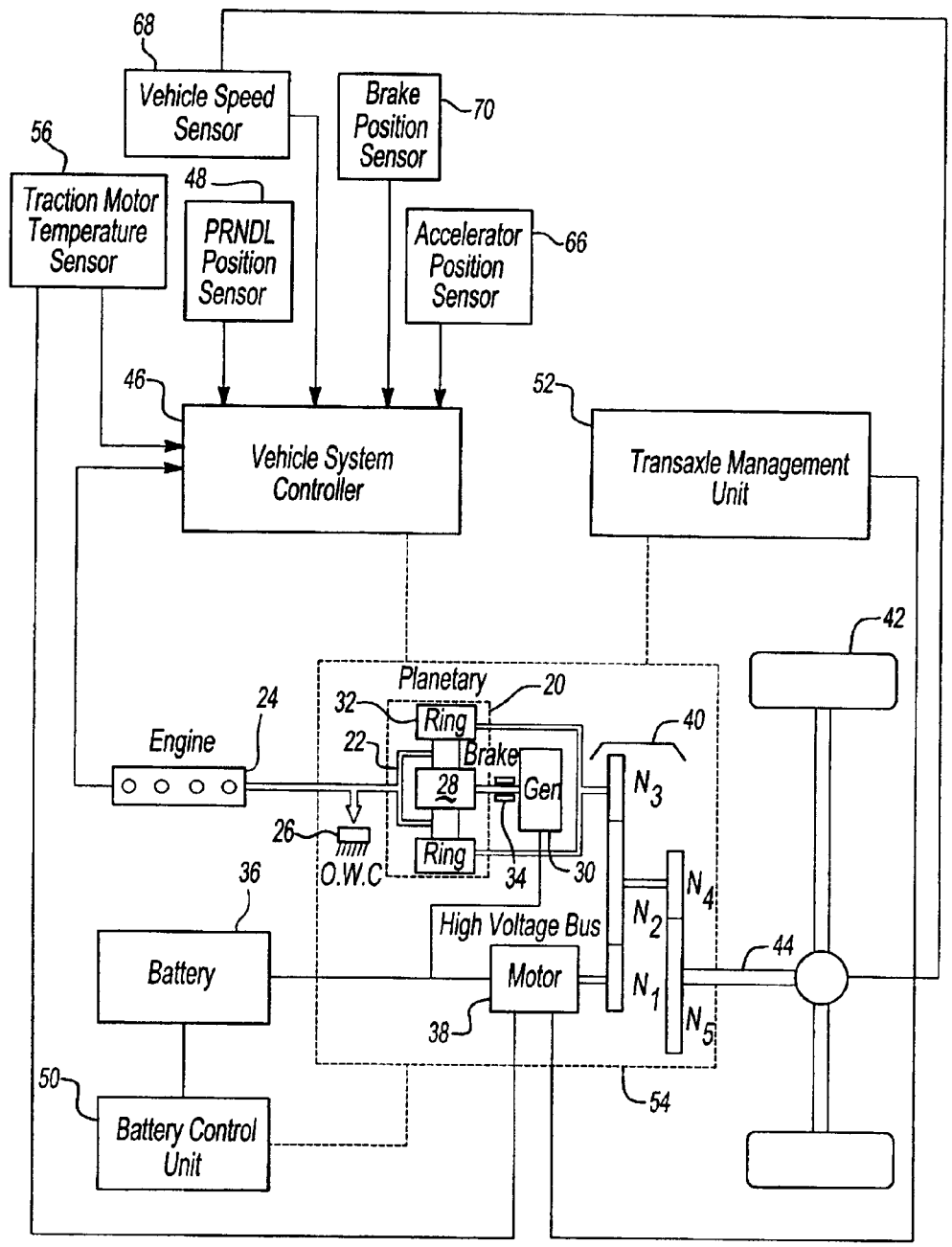
FIG. 1 illustrates a general hybrid electric vehicle (HEV) configuration.

The present invention relates to electric vehicles and, more particularly, to hybrid electric vehicles (HEVs). FIG. 1 demonstrates just one possible configuration, specifically a parallel/series hybrid electric vehicle (powersplit) configuration to assist in understanding the present invention.

In a basic HEV, a planetary gear set 20 mechanically couples a carrier gear 22 to an engine 24 with a one-way clutch 26 to prevent the engine 24 from rotating in a counter clockwise (CCW) direction. The planetary gear set 20 also mechanically couples a sun gear 28 to a generator motor 30 and a ring (output) gear 32. The generator motor 30 also mechanically links to a generator brake 34 and is electrically linked to a device to store electrical energy and output energy to battery 36 to receive electric energy converted from mechanical energy by the generator motor 30. A traction motor 38 is mechanically coupled to the ring gear 32 of the planetary gear set 20 via a second gear set 40 and is electrically linked to the battery 36. The ring gear 32 of the planetary gear set 20 and the traction motor 38 are mechanically coupled to drive wheels 42 via an output shaft 44. The mechanical coupling represents collectively a power transmission device, the power transmission devise being connected to the engine 24, the traction motor 38 and the generator motor 30. This power transmission device can be configured to have at least one forward drive position to move the HEV in a forward direction and at least one reverse drive position to move the HEV in a reverse direction. A driver operated drive position selector (gear selector) PRNDL (not shown) determines whether the vehicle is in Park, Reverse, Neutral, Drive, or Low-Drive.

The planetary gear set 20, splits the engine 24 output energy into a series path from the engine 24 to the generator motor 30 and a parallel path from the engine 24 to the drive wheels 42. Engine 24 speed can be controlled by varying the split to the series path while maintaining the mechanical connection through the parallel path. The traction motor 38 augments the engine 24 power to the drive wheels 42 on the parallel path through the second gear set 40. The traction motor 38 also provides the opportunity to use energy directly from the series path, essentially running off power created by the generator motor 30. This reduces losses associated with converting energy into and out of chemical energy in the battery 36 and allows all engine 24 energy, minus conversion losses, to reach the drive wheels 42.

A vehicle system controller (VSC) 46 can be included to control many components in this HEV configuration by connecting to each component's controller. The VSC 46 can also sense (receive) and monitor various vehicle inputs such as a gear selector (PRNDL) position sensor 48, an accelerator position sensor 66, a vehicle speed sensor 68, a traction motor temperature sensor 56 and a brake position sensor 70. An engine control unit (ECU) (not shown) can connect to the engine 24 via a hardwire interface. The ECU and VSC 46 can be based in the same unit, but are actually separate controllers. The VSC 46 communicates with the ECU, as well as a battery control unit (BCU) 50 and a transaxle management unit (TMU) 52 through a communication network such as a controller area network (CAN) 54. The BCU 50 connects to the battery 36 via a hardwire interface. The BCU 50 can monitor and communicate battery output capacity, temperature and state of charge (SOC) to the VSC. The TMU 52 controls the generator motor 30 and traction motor 38 via a hardwire interface.

When any vehicle is started from an uphill grade, a creep torque is expected by the driver to hold the vehicle on the hill before the driver applies an accelerator. When a vehicle is started from a level grade, the same creep torque is expected by the driver to inch the car forward creep even though no pressure is being applied to the accelerator.

Generally, the VSC 46 interprets driver demand (e.g., PRNDL, accelerator and brake position and vehicle speed), then determines when and the amount of creep and hill holding is needed to meet those driver demands while achieving specified vehicle performance (such as fuel economy, emissions and drivability). For example, in a drive-away from stop scenario when the engine 24 is not running, the VSC 46 will request the traction motor 38 to deliver certain creep torque (to mimic the convention vehicle creep) while the driver is in transition between a braking request and accelerator request (e.g., the transition time between when the driver removes pressure from a brake pedal and applies pressure to an accelerator pedal). The VSC 46 calculates a creep torque based on a predefined function of vehicle speed only used when accelerator input is zero (not depressed).

The VSC 46 can operate in several vehicle states. When the driver depresses the accelerator fully or partially, the vehicle will request the traction motor 38, and generator motor 30 if necessary, to deliver the driver's demanded torque. When the traction motor 38 and generator motor 30 combined can not satisfy the driver's torque demand, or the vehicle speed is greater than a predetermined vehicle speed, the engine 24 can be started to add to the combined output shaft 44 torque. If the engine 24 is running and engine 24 output can satisfy the driver's torque demand, only the engine 24 will provide the power to propel the vehicle.

The vehicle creep torque strategy of the present invention can operate in a variety of powertrain configurations. If the vehicle is driven away on an up-hill grade, a single predetermined creep torque may not be enough to hold the vehicle from rolling backward. In this instance, the strategy can increase the amount of creep torque to hold the vehicle and perhaps even give a little bit of forward creep. This would require the traction motor 38 to deliver high torque at near zero speed. Further, if this hill holding or hill creep is required for an extended period of time, the traction motor 38 temperature will rise due to high motor loss at high torque and near zero speed.

The engine 24 can be used to apply the desired hill holding or creep torque, thus avoiding increased temperature and loss to the traction motor 38. if the engine 24 is not running, it can be started. The generator motor 30 can be used to vary or regulate engine 24 output torque to achieve the desired hill holding or creep function without comprising engine 24 operating efficiency.

The present invention is a strategy to provide an HEV with hill holding or creep capability. The strategy is activated when the PRNDL is in drive or low-drive mode no accelerator applied. Alternatively, the strategy can also require no brake being applied (i.e., brake position is zero). The strategy can use the traction motor 38, generator motor 30, and the engine 24. The engine 24 is needed to achieve creep or hill holding when the traction motor 38 temperature exceeds a predefined value. The strategy can determine when to start the engine 24 and regulate the amount of engine 24 torque needed to hold the vehicle on the hill using the generator motor 30. This maintains efficient engine 24 usage and minimizes battery 36 usage and loss.

Figure 2:
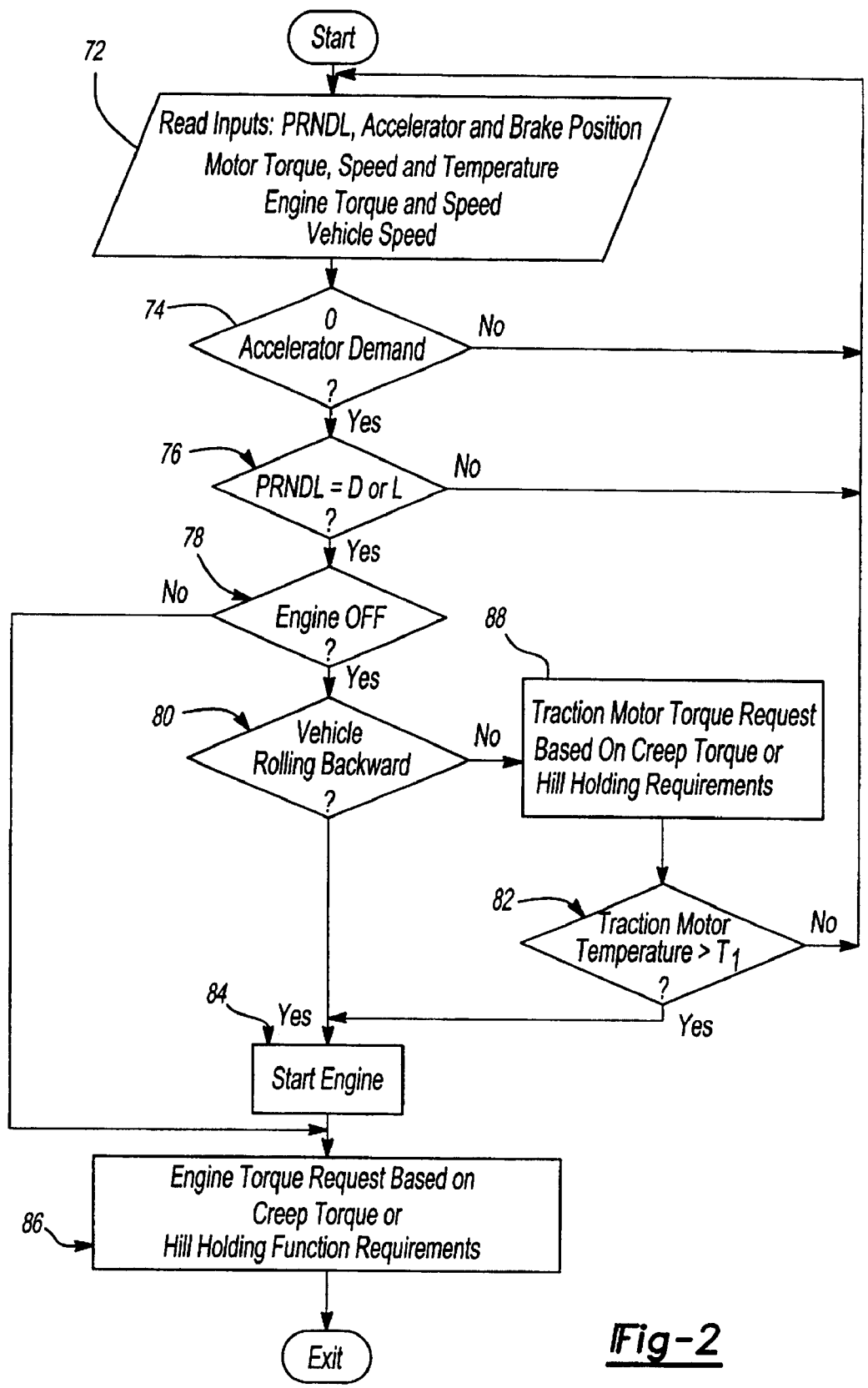
FIG. 2 illustrates a potential strategy of the present invention.

A possible strategy of the present invention to provide an HEV with this conventional creep and hill holding capabilities within the VSC 46 is illustrated in FIG. 2. The strategy begins with each key-on event and ends at each key-off event.

First, the strategy at step 72 monitors input from the PRNDL position sensor 48 and the accelerator position sensor 66. The strategy at step 72 can also monitor torque, speed and temperature of the traction motor 38, torque and speed of the generator motor 30, and torque and speed of engine 24. The strategy can even be configured to monitor the brake position sensor 70. Traction motor 38 torque and speed can be used to verify driver's zero accelerator pedal demand, and to determine whether the vehicle is rolling backward. The engine 24 torque and speed can be used to determine if the engine 24 is running.

The determination of whether the driver expects creep or hill holding can be made in a variety of ways such as brake and accelerator pedal positions and whether the vehicle is rolling backward. For this embodiment of the invention, the strategy first determines at step 74 whether accelerator demand is zero (e.g., the driver's foot is off the accelerator pedal). If no, the driver should be in control of the vehicle speed and direction and a creep hill holding function is not needed. Therefore, the strategy cycles back to step 72. If the accelerator is determined to be at zero demand at step 74, the strategy proceeds to step 76.

At step 76, the strategy determines whether the PRNDL is in a forward drive mode such as D (forward drive) or L (low forward drive) position. If no, the strategy returns to step 72. If yes, the strategy can established a need to activate creep or hill holding control and proceeds to step 78 to determine if the engine 24 is running.

If the engine 24 is determined to be off at step 78, the strategy proceeds to step 80 and determines whether the vehicle is rolling backward. There are a variety of ways known in the art to determine whether a vehicle is rolling backward. For this embodiment of the present invention, this determination is based on input from the PRNDL position sensor 48 and traction motor 38 rotational direction. If the traction motor 38 is rotating counter clock-wise and PRNDL is in D or L, the vehicle is considered to be rolling backward. If PRNDL is in the reverse (R) position, the strategy does not need to determine if vehicle is rolling backward since engine 24 can only provide forward propulsion. In this instance, only the traction motor 38 can be used to provide creep or hill holding.

If at step 80, the strategy determines the vehicle is rolling backward, the engine is started at step 84 followed by an engine 24 torque request at step 86. This request is based on a predetermined creep torque or hill holding function requirement. As described above, the request can start the engine 24 and hold it to an efficient speed and using the generator motor 30 to regulate the amount of torque needed for creep or hill holding.

If at step 80, the strategy determines the vehicle is not rolling backward, the strategy can request traction motor 38 torque to hold the vehicle at step 88. This request can be based on a predetermined creep torque or hill holding function requirement. As discussed above, the traction motor 38 holding the vehicle at little or no speed can cause its temperature to increase. Therefore, once after the traction motor 38 torque is requested in step 81, the strategy makes a determination in step 82 whether the traction motor 38 temperature is above a predetermined threshold. If no, the strategy cycles back to step 72.

If the traction motor 38 temperature is above a predetermined threshold in step 82, the strategy proceeds to step 84 and the engine 24 is started followed by the engine 24 torque request at step 86.

Returning to step 78, if the engine 24 is determined to be running, clearly there is no need to make the engine 24 start determination in steps 80, 82, and 84, so the strategy goes directly to the engine 24 torque request in step 86.

The above-described embodiment of the invention is provided purely for of example. Many other variations, modifications, and applications of the invention may be made.

What is claimed is:

1. A control system for a powersplit hybrid electric vehicle (HEV) powertrain powered by at least one of an engine, a traction motor, and a generator motor, comprising:

an accelerator position sensor;

a traction motor temperature sensor;

a vehicle speed sensor;

a PRNDL position sensor;

a battery for powering the traction motor and generator motor and receiving power from the generator motor; and a vehicle system control (VSC) to control the vehicle powertrain, the VSC receiving input from the accelerator position sensor, vehicle speed sensor, traction motor temperature sensor, and PRNDL position sensor, making a determination of whether zero accelerator demand from the driver is requested, making a determination of whether the PRNDL is in a forward drive mode, making a determination of whether the engine is running, making a determination of whether the vehicle is rolling backward, making a determination of whether the traction motor exceeds a predetermined temperature threshold, and starting the engine if the engine is off and traction motor temperature exceeds a predetermined threshold, starting the engine if the engine is off and the vehicle is rolling backward, commanding a traction motor torque request when the engine is off, accelerator demand is zero, the PRNDL is in the forward drive mode, and the vehicle is not rolling backward based on creep torque or hill holding function requirements, commanding the engine to start and providing engine torque when the engine is off, accelerator demand is zero, the PRNDL is in the forward drive mode, and the vehicle is rolling backward based on creep torque or hill holding function requirements, and commanding an engine torque request when the engine is running, accelerator demand is zero, and the PRNDL is in the forward drive mode based on creep torque or hill holding function requirements.

2. The control system of claim 1 further comprises a determination of brake position demand based on VSC input from a brake position sensor.

3. The control system of claim 2 wherein commanding the traction motor torque request further comprises a zero brake position demand.

4. The control system of claim 2 wherein commanding the engine torque request further comprises a zero brake position demand.

5. A method to control a powersplit hybrid electric vehicle (HEV) powertrain powered by at least one of an engine, a traction motor, and a generator motor, comprising the steps of:

sensing accelerator position;

sensing traction motor temperature;

sensing vehicle speed;

sensing PRNDL position;

powering the traction motor and generator motor and receiving power from the generator motor with a battery; and controlling the vehicle powertrain with a vehicle system control (VSC), the VSC receiving input from the accelerator position sensor, vehicle speed sensor, traction motor temperature sensor, and PRNDL position sensor, making a determination of whether zero accelerator demand from the driver is requested, making a determination of whether the PRNDL is in a forward drive mode, making a determination of whether the engine is running, making a determination of whether the vehicle is rolling backward, making a determination of whether the traction motor exceeds a predetermined temperature threshold, and starting the engine if the engine is off and traction motor temperature exceeds a predetermined threshold, starting the engine if the engine is off and the vehicle is rolling backward, commanding a traction motor torque request when the engine is off, accelerator demand is zero, the PRNDL is in the forward drive mode, and the vehicle is not rolling backward based on creep torque or hill holding function requirements, commanding the engine to start and providing engine torque when the engine is off, accelerator demand is zero, the PRNDL is in the forward drive mode, and the vehicle is rolling backward based on creep torque or hill holding function requirements, and commanding an engine torque request when the engine is running, accelerator demand is zero, and the PRNDL is in the forward drive mode based on creep torque or hill holding function requirements.

6. The method of claim 5 further comprising the step of making a determination brake position based on VSC input from a brake position sensor.

7. The method of claim 6 wherein commanding the traction motor torque request further comprises a zero brake position.

8. The method of claim 6 wherein commanding the engine torque request further comprises a zero brake position.

* * * * *